July 1, 1969 R. W. BRADLEY 3,452,926
PUNCH CHECK
Filed March 27, 1967 Sheet 1 of 2

INVENTOR.
ROGER W. BRADLEY
BY
Kevin R. Peterson
ATTORNEY.

INVENTOR.
ROGER W. BRADLEY
BY
Kevin R. Peterson
ATTORNEY.

United States Patent Office 3,452,926
Patented July 1, 1969

3,452,926

PUNCH CHECK

Roger W. Bradley, Wyandotte, Mich., assignor to Burroughs Corporation, Detroit, Mich., a corporation of Michigan Filed Mar. 27, 1967, Ser. No. 626,331
Int. Cl. G06k *1/04, 1/14*
U.S. Cl. 234—34 8 Claims

ABSTRACT OF THE DISCLOSURE

A device for verifying the operation of a card punch using a portion of the actuated punch to divert the magnetic flux of a permanent magnet from a first path where the flux saturates a magnetic core to a second path where the core is bypassed, or vice versa. A pulse used to select a particular punch is tested for comparison with a signal from a sense winding on the core which is energized under the influence of a core switching pulse from the data processor. The magnitude of the output pulse is dependent on the state of magnetic saturation of the core and in turn the position of the punch. Comparison of the punch selection pulse and the pulse from the sense winding on the core is used to verify operation of the punch.

*Summary of the invention*

The present invention relates to a device for verifying the operation of a punch element. More particularly, the present invention relates to a device for determining whether a punch has operated following a punch activating impulse.

In high speed data processing operations, punched cards are frequently used as the data input and output means. The usual punched card or Hollerith card has twelve rows and eighty columns of punch locations which are perforated in accordance with the program for the data to be read in or out of the computer. The cards must be punched accurately and at high speeds so it is essential that some means be provided to check each punched card.

In the past, punch checking devices have been provided which read each card following punching to determine the correctness of the aperture pattern. The electronic circuitry involved in this type of system, however, was quite complex and the complete reading of each card was time consuming. In another checking system, pairs of switch contacts have been provided adjacent the path of the punch member. The movement of the punch closed an electrical circuit between the switch contacts providing an output signal. The latter system being of a mechanical type was subject to breakdown and excessive wearing at the high operating speed of the punch.

It is, therefore, an object of the present invention to provide a new and improved punch checking device.

It is a further object of the present invention to provide a punch checking device capable of high speed operations.

*Brief description of the drawing*

The invention, both as to its organization and method of operation, together with further objects and advantages thereof, will best be understood by reference to the following detailed description taken in connection with the accompanying drawings, in which.

*Detailed description of the invention*

Figure 1:
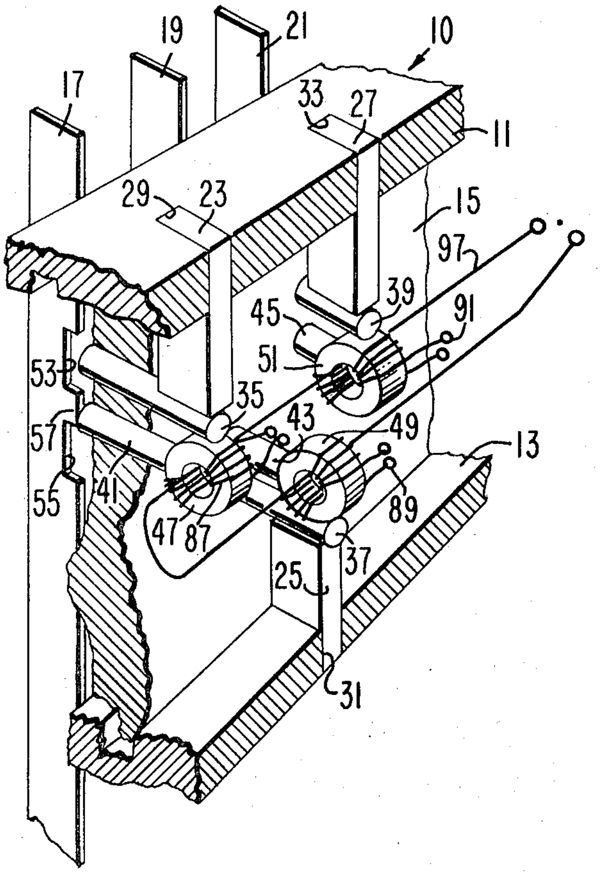
FIGURE 1 is a fragmentary perspective view of a portion of the punch checking device of the present invention with parts broken away to facilitate description.

Referring to FIGURE 1, the punch check device, indicated generally by the numeral 10, is shown as applied to three punches of the eighty punches used for a single row of punch locations. The punch check device can either be an accessory which is added to the machine, or it can be permanently incorporated into the structure of the machine.

The punch check device 10 comprises a pair of edge supporting members 11 and 13 made of a magnetically permeable material. Low carbon steel has been found particularly suitable for this application in view of its low residual magnetism. Between the two edge members and joined thereto by a tongue and groove connection is a front plate member 15 made of a non-magnetic material. Aluminum is preferred for use as the front plate although other materials having similar physical properties, for example, bronze, can also be employed.

In close contact with the edge members 11 and 13 and the front plate 15 are the punches used for a single row of punch locations on a card. The punches are made of hardened steel for prolonged use and are all similar and interchangeable. Three of the punches are shown and indicated by the numerals 17, 19 and 21, respectively. The remaining punch members would be similarly disposed in a continuous row, however, they have not been shown in order to simplify the description and drawings.

In association with each punch, there is a permanent magnet, 23, 25 and 27, respectively. The magnets are pressed into spaced cutouts 29, 31 and 33, along the edge supporting members 11 and 13. The punches 17 and 21 correspond to odd numbered punches and have their associated permanent magnets mounted in the upper edge support 11. The punch 19 corresponds to an even numbered punch and has its asosciated permanent magnet mounted in the lower edge support 13. The remaining odd and even numbered punches have their associated permanent magnets similarly disposed. The close spacing of the punches necessitates a high density packing requirement, accordingly, the magnets are arranged in two vetrically spaced and intersperesed groups to reduce mangetic interference and cross talk in the operation of the punch check.

A pair of flux path coupling means are disposed in spaced relation in the front plate 15 in line with each of the punch members. Each flux coupling pair consists of a long and short member made of a magnetically soft material. Low carbon steel similar to that used for the edge supporting members 11 and 13 is preferred for use in the coupling members. The long members 35, 37 and 39 project through an aperture in the front plate 15 and extend outwardly adjacent a pole of an associated permanent magnet. The short members 41, 43 and 45 project through an aperture in the front plate 15 and terminate adjacent magnetic cores 47, 49 and 51 which are disposed on the front plate adjacent the long member and in line with a pole of an associated permanent magnet.

The magnetic flux path coupling means provide alternate paths for the flux from each associated permanent magnet. The particular flux path selected is determined by a flux path diverting recess on each punch. The punch 17 has a pair of spaced recessed portions 53 and 55 which bound a land 57. When the punch 17 is in its perforating position, the flux path includes the permanent magnet 23, the edge support member 11, the punch 17, and the coupling member 35. When the punch 17 is in its retracted position, the flux path includes the permanent magnet 23, the edge support member 11, the punch 17, the land 57, the coupling member 41, and the magnetic core 47. All of the odd numbered punches have the same sequence of flux paths as the punch 17. The even numbered punches employ the reverse sequence of flux paths, that is, when the even numbered punches are in their perforating positions, the flux path includes the magnetic cores. The magnetic cores 47, 49 and 51 function as magnetic flux sensing means and in turn provide an output representative of the punch position.

Figure 2:
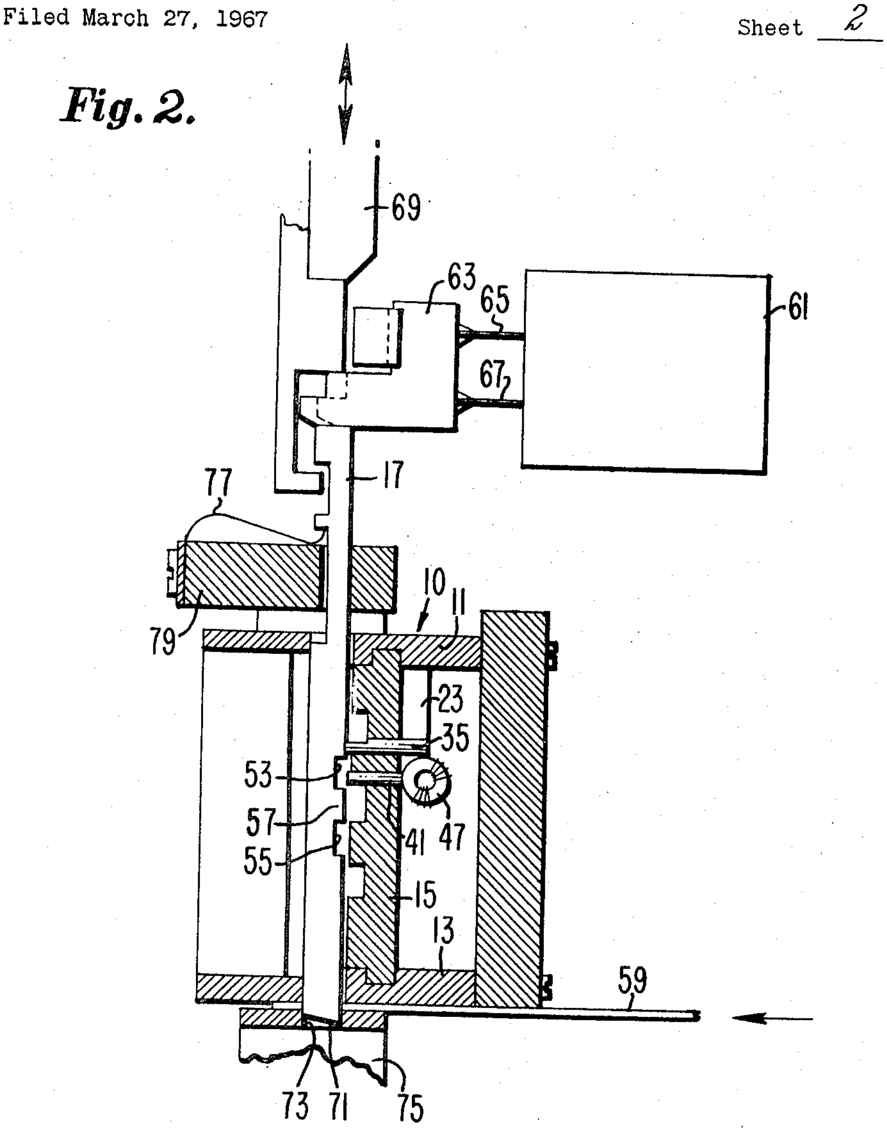
FIGURE 2 is an end elevational view of a punch checking device of the present invention shown with the punch drive elements and punch in perforating position.
Figures 3, 4:
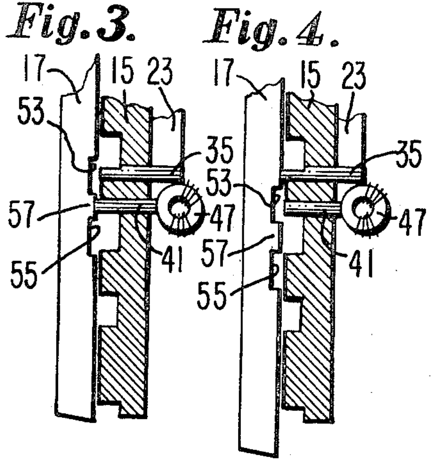
FIGURE 3 is a fragmentary view of a portion of the device of FIGURE 2 illustrating the relationship between the elements of the punch check with a punch in the retracted position.
FIGURE 4 is a fragmentary view of a portion of the device of FIGURE 2 illustrating the relationship between the elements of the punch check with a punch in the perforating position.

In FIGURE 2, a side elevational view of the punch checking device 10 is shown with the punch 17 in perforating position through a data card 59. In order to actuate the punch 17, a solenoid 61 is caused to move an interposer 63, which is supported by a pair of flexure members 65 and 67, into driven relationship with a continually reciprocating punch ram 69. The ram drives the interposer and punch downwardly so that the cutting edge 71 of the punch is driven through the data card into an opening 73 in the punch die 75. Following the punching operation, the punch 17 is withdrawn from the data card and supported in the non-perforating position by a flexure 77 mounted on the machine frame 79.

When the punch 17 is in the perforating position, the recess 53 is aligned with the flux coupling means 41. The magnetic flux from the magnet 23 is caused to shunt the core 47 which is then free to change magnetic state under the influence of a switching pulse from the data processor. At the same time, the adjacent portion of the punch above the cutout 53 is aligned with the flux coupling means 35. In view of the low reluctance of the flux path through the coupling means 35 and the high reluctance or low permeability of the flux path across the air gap, the magnetic flux is diverted away from the coupling means 41. When the punch 17 returns to the non-perforating position, the land 57 aligns with the flux coupling means 41 and an air gap caused by the cutout portion 53 is aligned with the flux coupling means 35. The presence of the air gap hinders the passage of the magnetic flux and tends to divert the flux through the flux coupling means 41. The magnetic flux passes through the magnetic core 47 which becomes saturated and inhibited from changing magnetic state under the influence of a subsequent switching pulse.

The spatial relationships between the flux coupling members and the land and recessed portions of the punch should be considered in using the punch checking device of the present invention. It is important in the operation of the device that the flux coupling members be so positioned that the land portion of the punch is in alignment with only one coupling member when in the perforating and retracted positions. The cutout portions on either side of the land should be of sufficient size and depth to bracket the end of the coupling member not carrying the magnetic flux. The width and depth of the cutout portions should be sufficient to effectively isolate the coupling member in order to eliminate flux leakage and loss of signal strength from the flux sensing core. All of the part spacing should be dictated by the length of travel of the punch. The necessary flux paths must be completed and interrupted within this fixed distance.

Figure 5:
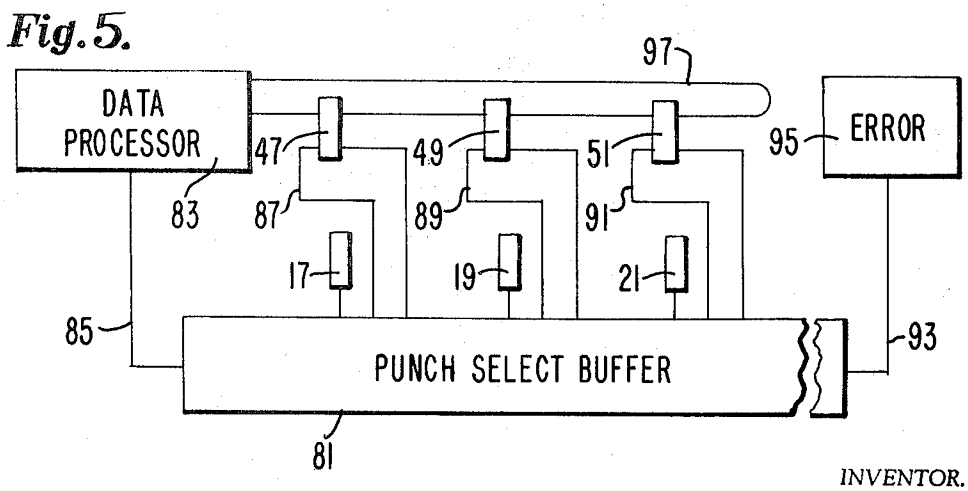
FIGURE 5 is a fragmentary schematic view, in block diagram form, showing the electrical connection of the punch checking device of the present invention.

Referring to FIGURE 5, the punches 17, 19 and 21 are shown coupled to a punch select buffer 81. The punch select buffer receives input signals from the data processor 83 on an input line 85. The input signals select a punch pattern for each row of a Hollerith card and causes the buffer to generate the interposer release signals. The interposer release signals cause the selected interposers to move into driving relation with a punch ram which drives the selected punches through the selected positions in the Hollerith card.

The punch select buffer 81 contains a group of flip-flops, not shown, that provide the interposer release signals. There is a flip-flop corresponding to each of the 80 punches. Selected flip-flops are conditioned by the data processor 83 when an aperture is to be punched in a card.

After the punch select buffer flip-flops provide the signals to release the selected interposers and the corresponding punches move into the perforating positions, the flip-flops are cleared to their original condition. The signals from sense coils 87, 89 and 91, wound around the cores are then applied to the flip-flops of the buffer 81. The received signals are a replica of the prior signals that were in the flip-flops and are compared with the prior condition of the flip-flops for punching errors. The individual punch where an error occurs is indicated by a signal which is transmitted on line 93 to error indicator 95.

In order to better understand the operation of the punch checking device of the present invention, assume that punch 17, corresponding to an odd numbered punch, and punch 19, corresponding to an even numbered punch, were selected. After the selected punches have been moved by the punch ram into what should be the perforating position, the data processor 83 transmits a core switching pulse on the line 97. As mentioned above, when the punch 17 is in its perforating position, the flux diverting recess means 53 is moved so that the magnetic flux shunts the core 47. The core is no longer saturated by the flux from the associated permanent magnet 23 and is, therefore, allowed to switch. The sense winding 87 on the core 47 produces an output pulse to the punch select buffer 81 under the influence of the core switching pulse.

In contrast to the punch 17, the movement of the punch 19 to its perforating position causes the magnetic flux path to pass through the core 49. The core becomes saturated by the flux from the permanent magnet 25 and is inhibited from switching under the influence of the pulse on the line 97. The sense winding 89 on the core 49 produces either no output or a very small output pulse to the punch select buffer 81.

The output signals from the sense windings 87 and 89 are applied to the associated flip-flops in the buffer 81. If the flip-flops are not properly set by the sensed pulse, then an error signal is generated and transmitted on the line 93 to the error indicator 95 when the signals in the flip-flops are checked for comparison with the signals previously stored in the flip-flops.

It can be seen that the punch checking device of the present invention provides a means for rapidly determining the presence of punching errors during the punching cycle and without the time delay or electronic complexities involved in reading the punched card. Furthermore, the only moving part subject to mechanical failure is the punch itself.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

What is claimed is:

1. A punch operation verifying device comprising:

a source of magnetic flux, a support for said source, a punch means operatively associated with said support and adapted to move between a perforating and retracted position, at least one magnetic flux path diverting means on said punch means, a first and second magnetic flux path coupling means in spaced positions on said support and forming alternate flux paths between said source and said punch, a magnetic flux sensing means in the flux path of one of said coupling means, and output means for said magnetic flux sensing means for producing an output signal under the influence of a signal tending to change the magnetic state of said flux sensing means.

2. A punch operation verifying device as set forth in claim 1 wherein said source of magnetic flux is a permanent magnet.

3. A punch operation verifying device as set forth in claim 1 wherein said magnetic flux path diverting means comprises a recessed portion of said punch.

4. A punch operation verifying device as set forth in claim 1 wherein said magnetic flux sensing means comprises a magnetic core.

5. A punch operation verifying device as set forth in claim 4 wherein said output means comprises a sense winding on said magnetic core.

6. A punch operation verifying device as set forth in claim 3 wherein said punch means has a pair of spaced recessed portions.

7. A punch operation verifying device as set forth in claim 6 wherein each of said recessed portions is at least as wide as said magnetic flux path coupling means.

8. A punch operation verifying device as set forth in claim 1 wherein each of said magnetic flux path coupling means is positioned on said support means so as to be alternately aligned with said flux diverting means as said punch moves between the perforating and retracted positions.

References Cited

UNITED STATES PATENTS

| | | | |
|---|---|---|---|
| 2,609,433 | 9/1952 | Goff | 234—33 X |
| 3,159,337 | 12/1964 | MacNeill | 234—33 |
| 3,245,615 | 4/1966 | Heymann | 234—33 |

WILLIAM S. LAWSON, *Primary Examiner.*

U.S. Cl. X.R.

234—115